US005846637A

United States Patent [19]

Malhotra et al.

[11] Patent Number: 5,846,637

[45] Date of Patent: Dec. 8, 1998

[54] COATED XEROGRAPHIC PHOTOGRAPHIC PAPER

[75] Inventors: Shadi L. Malhotra; Kirit N. Naik, both of Mississauga, Canada

[73] Assignee: Xerox Corporation, Stamford, Conn.

[21] Appl. No.: 852,555

[22] Filed: May 7, 1997

[51] Int. Cl.[6] .......... B32B 3/00

[52] U.S. Cl. .......... 428/195; 428/211; 428/423.1; 428/481; 428/511; 430/124; 430/126; 347/105; 347/112

[58] Field of Search .......... 428/195, 211, 428/215, 216, 423.1, 481, 484, 488.1, 511, 521, 522; 430/124, 126; 347/105, 112

[56] References Cited

U.S. PATENT DOCUMENTS

| | | | |
|---|---|---|---|
| 3,154,461 | 10/1964 | Johnson | 161/116 |
| 3,790,435 | 2/1974 | Tanba et al. | 161/160 |
| 4,663,216 | 5/1987 | Toyoda et al. | 428/212 |
| 4,705,719 | 11/1987 | Yamanaka et al. | 428/323 |
| 4,795,676 | 1/1989 | Maekawa et al. | 428/328 |
| 4,868,581 | 9/1989 | Mouri et al. | 346/1.1 |
| 4,903,039 | 2/1990 | Light | 346/1.1 |
| 4,903,040 | 2/1990 | Light | 345/1.1 |
| 4,903,041 | 2/1990 | Light | 346/1.1 |
| 4,956,225 | 9/1990 | Malhotra | 428/216 |
| 4,997,697 | 3/1991 | Malhotra | 428/195 |
| 5,006,407 | 4/1991 | Malhotra | 428/336 |
| 5,075,153 | 12/1991 | Malhotra | 428/207 |
| 5,118,570 | 6/1992 | Malhotra | 428/474.4 |
| 5,145,749 | 9/1992 | Matthew | 428/511 |
| 5,202,205 | 4/1993 | Malhota | 430/17 |
| 5,244,714 | 9/1993 | Malhotra et al. | 428/195 |
| 5,302,439 | 4/1994 | Malhotra et al. | 428/195 |
| 5,451,458 | 9/1995 | Malhotra | 428/412 |
| 5,624,743 | 4/1997 | Malhotra | 428/216 |
| 5,663,022 | 9/1997 | Malhotra | 430/97 |
| 5,709,976 | 1/1998 | Malhotra | 430/124 |

*Primary Examiner*—Elizabeth Evans
*Attorney, Agent, or Firm*—E. O. Palazzo

[57] ABSTRACT

A coated xerographic photographic paper comprised of (1) a cellulosic substrate; (2) a first antistatic coating layer in contact with one surface of the substrate; (3) a second toner receiving coating on the top of the antistatic layer, and comprised of a mixture of a binder polymer, a toner spreading agent, a lightfastness inducing agent, a biocide, and a filler; and (4) a third traction controlling coating in contact with the back side of the substrate comprised of a mixture of a polymer with a glass transition temperature of from between about −50° C. to about 50° C., an antistatic agent, a lightfastness agent, a biocide and a pigment. The traction promoting third coating is also capable of receiving images from a xerographic copier/printer. The cellulosic substrate is comprised of alkaline sized and acid sized blends of hardwood kraft and softwood kraft fibers, which blends contain from about 10 percent to about 90 percent by weight of softwood and from about 90 to about 10 percent by weight of hardwood. The sizing value of the cellulosic substrate varies between 200 seconds to 1,100 seconds, the porosity varies from 50 to 300 mil/minute, and the thickness varies between 50 microns to 250 microns.

27 Claims, No Drawings

COATED XEROGRAPHIC PHOTOGRAPHIC PAPER

BACKGROUND OF THE INVENTION

The present invention is directed to papers, and more specifically, to papers for electrography, such as xerographic compatible photographic papers, that is for example coated papers containing a supporting substrate derived from natural cellulose and having the appearance of a photographic base paper, with certain coatings thereover and thereunder, and the use of these papers in imaging, especailly xerographic and digital imaging processes with liquid inks or dry toners. More specifically, the present invention is directed to photographic papers capable of recording clear, brilliant, glossy images of high optical density, and with lightfastness values of greater than about 98 percent, and more specifically, from about 98 to about 100 percent for dry colored, such as pigmented toners, waterfastness values of about 100 percent and comparable in look and feel to conventional color photographic camera prints. The coated papers can be prepared from papers containing a two layer toner receiving layer on the front side of the paper and a traction promoting coating on the back side of the xerographic photographic paper. One embodiment of the present invention is directed to xerographically printable coated papers comprised of (1) a substrate such as paper, (2) a first antistatic layer coating on one surface of the substrate, (3) a second toner receiving layer coating in contact with the antistatic layer and capable of wetting and spreading the toner, (4) a third traction controlling layer coating in contact with the back side of the paper substrate and comprised of at least one, for example from 1 to about 10, and preferably one, component selected from the group consisting of polymers having a glass transition temperature of between about −50° C. to about 50° C. (Centigrade) and preferably from about −40° C. to about 40° C. (Centigrade), such as polyester latexes, styrene-butadiene latexes and the like, and a filler/pigment such as zirconium oxide, microspheres and the like. The traction promoting third coating is also capable of receiving images from a xerographic copier/printer.

The papers of the present invention can, for example, include xerographic paper suitable for photofinishing purposes in a xerographic device with one side of the paper (Lusto Gloss) being coated with, for example, polyethylene or cellulose triacetate, and thereby enabling a gloss finish, and the other side being coated to enable a matte finish, and wherein an anitstatic agent can be added for improved paper handling.

PRIOR ART

U.S. Pat. No. 3,154,461 discloses polymeric film structures having a matte-finish and a cellular structure achieved with the addition of pigments which roughens the surface upon stretching of the films and renders them receptive to marking by crayons, pencil and ball-point pen.

Disclosed in U.S. Pat. No. 3,790,435 are synthetic papers with acceptable foldability of a nonlaminated structure of one thermophotographic resin film or a laminated structure of at least two thermophotographic resin films. Each of the films is stretched or molecularly oriented, and one or more of the films contain a fine inorganic filler to provide paperness of the film. According to this patent some of the films may contain poly(styrene) as a foldability improving agent.

There is disclosed in U.S. Pat. No. 4,663,216 a synthetic paper printable in high gloss, and comprised of (1) multilayer support, (2) a layer of a transparent film of a thermophotographic resin free from an inorganic fine powder formed on one surface of the support (1), and (3) a primer layer of a specific material, reference the Abstract of the Disclosure for example. The support (1) comprises (la) a base layer of a biaxially stretched film of a thermophotographic resin, a surface and a back layer (1b), and (1 c) composed of a monoaxially stretched film of a thermophotographic resin containing 8 to 65 percent by weight of an inorganic fine powder.

Further, there is disclosed in U.S. Pat. No. 4,705,719 a synthetic paper of multilayer resin film comprising a base layer (1a) of a biaxially stretched thermophotographic resin film, and a laminate provided on at least one of opposite surfaces of the base layer, the laminate including a paperline layer (1b) and a surface layer (1c), the paper like layer containing a uniaxially stretched film of thermophotographic resin containing 8 to 65 percent by weight of inorganic fine powder, the surface layer containing an uniaxially stretched film of a thermophotographic resin. Also known is an electrostatic recording material comprised of a multi-layered sheet support having an electroconductive layer and dielectric layers formed thereon, reference for example U.S. Pat. No. 4,795,676.

In U.S. Pat. No. 4,868,581, there is disclosed an opaque paperbased receiving material for ink jet printing which comprises a poly(olefin)coated paper overcoated with an ink-receiving layer which contains a mixture of gelatin and starch. Reportedly, these receiving materials exhibit high gloss, good color density and are smudge resistant. Although such receiving materials, when pictorially imaged with an ink jet printing device, produce images that approach conventional photographic prints in appearance and feel, the images thereon are still not of the same high quality that is customarily expected from and exhibited by photographic prints.

Also, there is disclosed in U.S. Pat. No. 4,903,039 an opaque paper-based receiving material for ink jet printing, which papers comprise a poly(olefin)-coated paper overcoated with an ink-receiving layer which contains an aqueous dispersion of a polyester ionomer, namely a poly [cyclohexylenedimethylene-co-xydiethylene isophthalate-co-malonate-co-sodiosulfobenzenedicarboxylate], dispersed in vinyl pyrrolidone polymer.

Further, there is disclosed in U.S. Pat. No. 4,903,040 an opaque paper-based receiving material for ink jet printing which comprises a poly(olefin)-coated paper overcoated with an ink-receiving layer which contains an aqueous dispersion of a polyester ionomer, namely a poly [cyclohexylenedimethylene isophthalate-co-sodiosulfobenzene dicarboxylate], dispersed in vinyl pyrrolidone polymer.

Moreover, there is disclosed in U.S. Pat. No. 4,903,041 an opaque paper-based receiving material for ink jet printing which comprises a poly(olefin)-coated paper overcoated with an ink-receiving layer which contains an aqueous dispersion of a polyester ionomer, namely a poly [cyclohexylenedimethylene-co-xylyleneterephthalate-co-malonate-co-sodioiminobis(sulfonylbenzoate], dispersed in vinyl pyrrolidone polymer.

Further, there is disclosed in U.S. Pat. No. 5,075,153 a never-tear paper comprised of a photographic supporting substrate, a binder layer comprised of polymers selected from the group consisting of (1) hydroxy propyl cellulose, (2) poly(vinylalkylether), (3) vinylpyrrolidone/vinylvinylacetate, (4) quaternized vinyl pyrrolidone/dialkylaminoethyl/methacrylate, (5) poly(vinylpyrrolidone), (6) poly(ethyleneimine), or mixtures thereof; and a pigment, or pigments; and an ink receiving polymer layer.

U.S. Pat. No. 5,118,570 and U.S. Pat. No. 5,006,407, the disclosures of each of which are totally incorporated herein by reference, disclose a transparency which comprises a hydrophilic coating and a plasticizer, which plasticizer can, for example, be a phosphate, a substituted phthalic anhydride, glycerols, glycols, substituted glycerols, pyrrolidinones, alkylene carbonates, sulfolanes, and stearic acid derivatives.

U.S. Pat. No. 5,145,749 discloses erasable coatings for xerography paper which comprise a pigment such as calcium carbonate in a binder such as an aqueous emulsion of an acrylic polymer. The erasability of the coating is improved by replacing at least 15 weight percent of the binder with a polyalkane or polyalkene wax, such as an aqueous emulsion of a polyolefin.

U.S. Pat. No. 4,956,225 discloses a transparency suitable for electrographic and xerographic imaging which comprises a polymeric substrate with a toner receptive coating on one surface thereof comprising blends selected from the group consisting of poly(ethylene oxide) and carboxymethyl cellulose; poly(ethylene oxide), carboxymethyl cellulose, and hydroxypropyl cellulose; poly(ethylene oxide) and vinylidene fluoride/hexafluoropropylene copolymer; poly (chloroprene) and poly(alpha-methylstyrene); poly (caprolactone) and poly(alpha-methylstyrene); poly(vinyl isobutyl ether) and poly(alphamethylstyrene); poly (caprolactone) and poly(p-isopropyl alpha-methylstyrene); blends of poly(1,4-butylene adipate) and poly(alpha-methylstyrene); chlorinated poly(propylene) and poly (alpha-methylstyrene); chlorinated poly(ethylene) and poly (alpha-methylstyrene); and chlorinated rubber and poly (alphamethylstyrene). Also disclosed are transparencies with first and second coating layers.

U.S. Pat. No. 4,997,697 discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

U.S. Pat. No. 5,202,205, the disclosure of which is totally incorporated herein by reference, discloses a transparent substrate material for receiving or containing an image comprising a supporting substrate, an ink toner receiving coating composition on both sides of the substrate and comprising an adhesive layer and an antistatic layer contained on two surfaces of the adhesive layer, which antistatic layer comprises mixtures or complexes of metal halides or urea compounds both with polymers containing oxyalkylene segments.

U.S. Pat. No. 5,244,714, the disclosure of which is totally incorporated herein by reference, discloses a recording sheet which comprises a base sheet, an antistatic layer coated on at least one surface of the base sheet comprising a mixture of a first component selected from the group consisting of hydrophilic polysaccharides and a second component selected from the group consisting of poly(vinyl amines), poly(vinyl phosphates), poly(vinyl alcohols), poly(vinyl alcohol)-ethoxylated, poly(ethylene imine)ethoxylated, poly (ethylene oxides), poly(n-vinylacetamide-vinylsulfonatesalts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

U.S. Pat. No. 5,302,439, the disclosure of which is totally incorporated herein by reference, discloses a recording sheet which comprises (a) a substrate; (b) a coating on the substrate which comprises a binder and a material having a melting point of less than 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated and unsaturated fatty acids, alkyl aldehydes, alkyl anhydrides, alkanes, and mixtures thereof; (c) an optional traction agent; and (d) an optional antistatic agent.

U.S. Pat. No. 5,451,458, the disclosure of which is totally incorporated herein by reference, discloses a recording sheet which comprises (a) a substrate; (b) a coating on the substrate which comprises (1) a binder selected from the group consisting of (A) polyesters; (B) polyvinyl acetals; (C) vinyl alcohol-vinyl acetal copolymers; (D) polycarbonates; and (E) mixtures thereof; and (2) an additive having a melting point of less than about 65° C. and a boiling point of more than about 150° C. and including, for example, furan derivatives; and developing the latent image with a toner which comprises a colorant and a resin selected from the group consisting of (A) polyesters; (B) polyvinyl acetals; (C) vinyl alcohol-vinyl acetal copolymers; (D) polycarbonates; and (E) mixtures thereof; and (3) transferring the developed image to a recording sheet which comprises (a) a substrate; (b) a coating on the substrate which comprises (1) a binder selected from the group consisting of (A) polyesters; (B) polyvinyl acetals; (C) vinyl alcohol-vinyl acetal copolymers; (D) polycarbonates; and (E) mixtures thereof.

While the above materials and processes are suitable for their intended purposes, a need remains for photographic papers particularly suitable for use in electrophotographic applications. In addition, a need remains for photographic papers which can be employed with xerographic liquid and dry toners so that the heat and energy required for fusing the toner to the photographic paper is reduced by about 14 percent allowing the toner to be fused at 150° C. instead of the conventional about 175° C. Further, a need remains for photographic papers which can be employed with xerographic toners so that jamming of the photographic papers in the fusing apparatus is reduced. Additionally, there is a need for photographic papers suitable for use in electrophotographic applications with reduced energy dermands, by about 14 percent, allowing the toner to be fused at 150° C. instead of the usual in some instances of about 175° to 180° C., and reduced jamming, wherein the photographs also exhibit acceptable image quality and image fix to the photographic papers.

SUMMARY OF THE INVENTION

It is an object of the present invention to provide photographic papers with many of the advantages indicated herein.

It is another object of the present invention to provide photographic papers particularly suitable for use in electrophotographic imaging systems.

It is yet another object of the present invention to provide photographic papers which can be employed with xerographic dry toners, and wherein the heat and energy required for fusing the toner to the photographic paper is reduced.

It is still another object of the present invention to provide photographic papers which can be selected with xerographic dry toners, and wherein jamming of the photographic papers in the fusing apparatus is minimized.

Another object of the present invention is to provide photographic papers suitable for use in electrophotographic, especially xerographic, imaging methods with reduced fusing energy requirements and reduced jamming, wherein the photographs also exhibit acceptable image quality and excellent image fix to the photographic papers.

Embodiments of the present invention include a coated photographic paper comprised of (1) a substrate, such as a cellulosic substrate, (2) an antistatic layer in contact with one surface of the substrate, (3) a second toner receiving layer in contact with the the antistatic layer and comprised of a mixture of a binder polymer, a toner wetting/spreading agent, a lightfastness agent, a biocide, and a filler, and (4) a third traction controlling layer in contact with the substrate, and comprised of a mixture of a polymer with a glass transition temperature of from between about −50° C. to about 50° C., an antistatic agent, a lightfastness agent, a filler and a biocide.

In embodiments, the present invention is directed to a paper comprised of a (1) substrate such as paper, (2) a first antistatic film forming polymer layer on one surface of, and in contact with the substrate, (3) a second toner receiving coating on top of the antistatic layer and capable of wetting and spreading the toner, and which layer is comprised of a water insoluble polymer such as vinyl acetate-vinylalcohol-copolymer, polyester, polycarbonate, ethylene-vinylacetate copolymer and the like, or mixtures thereof, a toner wetting/spreading agent such as a liquid crystalline compound, a lightfastness agent such as 1,2-hydroxy-4-(octyloxy) benzophenone; 2-(4-benzoyl-3-hydroxyphenoxy)ethyl acrylate and the like, an optional biocide like 2-hydroxypropylmethane thiosulfonate, a filler such as clay, calcium carbonate, colloidal silica, and (4) a third traction controlling coating in contact with the back, or reverse side of the paper substrate and comprised of at least one material, or component selected from the group consisting of polymers having a glass transition temperature of between −50° C. to about 50° C., and preferably from about −40° C. to about +40° C., and more preferably from about to about −40° C. to about +35° C., such a polyester latex, acrylic latex and the like, a filler/pigment such as zirconium oxide, microspheres and the like. The traction promoting third coating is also capable of receiving images from a xerographic copier/printer.

DETAILED DESCRIPTION OF THE INVENTION

The photographic papers of the present invention comprise a substrate or base sheet having a coating on both lateral surfaces thereof. Any suitable substrate can be employed. In embodiments of the present invention, the substrate is comprised of sized blends of hardwood kraft and softwood kraft fibers, which blends contain from about 10 percent to 90 percent by weight of softwood and from about 90 to about 10 percent by weight of hardwood. Examples of hardwood include Seagull W dry bleached hardwood kraft preferably present, for example, in one embodiment in an amount of 70 percent by weight. Examples of softwood include La Toque dry bleached softwood kraft present, for example, in one embodiment in an amount of 30 percent by weight. These sized substrates may also contain pigments in effective amounts of from about 1 to about 60, and from 1 to about 25 percent by weight, such as clay (available from Georgia Kaolin Company, Astro-fil 90 clay, Engelhard Ansilex clay), titanium dioxide (available from Tioxide Company—Anatase grade AHR), calcium silicate CH-427-97-8, XP-974 (J. M. Huber Corporation), and the like. Also, the sized substrates may contain various effective amounts of sizing chemicals (for example from about 0.25 percent to about 25 percent by weight of pulp), such as Mon size (available from Monsanto Company), Hercon-76 (available from Hercules Company), Alum (available from Allied Chemicals as Iron free alum), and retention aid (available from Allied Colloids as Percol 292). The sizing values of papers, including the commercial papers that can be selected for the present invention in an embodiment thereof, vary between about 0.4 second to about 4,685 seconds, however, papers in the sizing range of 50 seconds to 300 seconds are preferred, primarily to decrease costs. The porosity values of the substrates which are preferably porous varies from about 100 to about 1,260 mil/minute and preferably from about 100 to about 600 mil/minute to permit, for example, the use of these papers for various printing technologies such as thermal transfer, liquid toner development, xerography, ink jet processes, and the like.

Illustrative examples of commercially available, internally and externally (surface) sized substrates that may be selected for the present invention, and which are treated with a desizing agent dispersed in an optional binder with a substrate thickness of, for example, from about 50 microns to about 200 microns and preferably of a thickness of from about 100 microns to about 125 microns include Diazo papers, offset papers such as Great Lakes offset, recycled papers such as Conservatree, office papers such as Automimeo, Eddy liquid toner paper and copy papers from companies such as Nekoosa, Champion, Wiggins Teape, Kymmene, Modo, Domtar, Veitsiluoto and Sanyo with Xerox 4024™ papers and sized calcium silicate-clay filled papers being particularly preferred in view of their availability, and low print through.

The first layer antistatic coating is present on the front, or first side of the substrate of the coated photographic paper of the present invention in any effective thickness. Typically, the total thickness of this coating layer is from about 0.1 to about 25 microns and preferably from about 0.5 to 10 microns, although the thickness may be outside of these ranges.

The second layer coating composition capable of receiving images from, for example, a xerographic copier/printer is present on the top of the antistatic layer of the coated photographic paper of the present invention in any effective thickness. Typically, the total thickness of this coating layer is from about 0.1 to about 25 microns and preferably from about 0.5 to about 10 microns, although the thickness can be outside of these ranges. In a total of 100 parts by weight in the second coating composition, the binder or mixture thereof is present in amounts of from about 35 parts by weight to about 90 parts by weight. The toner wetting and spreading agent, such as liquid crystalline compounds, are present in the second layer coating composition in amounts of from about 45 parts by weight to about 1 part by weight, the lightfastness agent is present in the first coating composition in amounts of from about 15 parts by weight to about 1 part by weight, the filler of the second layer coating composition is present in amounts of from about 1 part by weight to about 7 parts by weight, and the biocide of the second layer coating composition is present in amounts of from about 4 parts by weight to about 1 part by weight (35+45+15+1+4) to (90+1+1+1+7+1).

The aforementioned amounts can be determined, for example, as follows:

Various blends of the binder, toner wetting and spreading agent, lightfastness inducing agent, fillers, and the biocide were prepared in methanol and coated on to various base sheets, such as paper, to yield coated photographic papers with a double layer thereover and single layer thereunder. After drying the base sheets at 100° C., these were tested for coating adhesion to the base sheet, printed with a Xerox Corporation copier to, for example, check print quality, drying times of the images, and lightfastness. The data was analyzed statistically for optimum range of compositions for the first, second and third layer compositions.

A preferred composition range for the third traction layer coating of the photographic paper is the binder present in amounts of from about 10 parts by weight to about 40 parts by weight, the antistatic agent is present in an amount of from about 1 parts by weight to about 20 parts by weight, the lightfastness inducing agents are present in amounts of from about 1 parts by weight to about 10 parts by weight, the pigment is present in amounts of from about 87 parts by weight to about 25 parts by weight, and the biocide compound is present in amounts of from about 1 part by weight to about 5 parts by weight based on 100 parts (10+1+1+87+1) to (40+20+10+25+5).

The antistatic components of the first layer are comprised of film forming cationic polymers, non-film forming cationic and anionic compounds, and the like. When the antistatic component is a film forming cationic polymer, it can be present in amounts of about 100 parts by weight, and when the selected antistatic compound is not film forming it may be blended with a film forming polymeric binder. In these blends the antistatic component amount is, for example, from about 10 percent by weight to about 90 percent by weight and the film forming binder polymer amount is, for example, from about 90 percent by weight to about 10 percent by weight, although the amounts may be outside these ranges.

The film forming polymers are comprised, for example, of cationic antistatic components selected from the group consisting of film forming quaternary acrylic copolymer latexes, available as HX-42-1, HX-42-3 from Interpol Corporation, and poly(acrylamide-co-diallyl dimethyl ammonium chloride), #40,908-1, from Aldrich Chemical Company; quaternary block copolymers, such as MIRAPOL A-15 and MIRAPOL WT available from Miranol, Incorporated, Dayton, New Jersey, prepared as disclosed in U.S. Pat. No. 4,157,388, the disclosure of which is totally incorporated herein by reference, MIRAPOL AZ-1 available from Miranol, Incorporated, prepared as disclosed in U.S. Pat. No. 4,719,282, the disclosure of which is totally incorporated herein by reference, MIRAPOL AD-1 available from Miranol, Incorporated, prepared as disclosed in U.S. Pat. No. 4,157,388, MIRAPOL 9, MIRAPOL 95, and MIRAPOL 175 available from Miranol, Incorporated, Dayton, New Jersey, as disclosed in U.S. Pat. No. 4,719,282, as well as mixtures thereof.

The non-film forming antistatic compounds include quaternary salts, such as Cordex AT-172, and other materials available from Finetex Corporation, also suitable are monoammonium compounds as disclosed in, for example, U.S. Pat. No. 5,320,902, the disclosure of which is totally incorporated herein by reference, formaldehyde-free Gardol DR/NF® available from Apollo Chemical Corporation, polyquaternary amine Perchem 553® available from Chem Link Industrial, polyquaternary amine, Polyplus 1290® available from Betz Paper Chem Inc., and Armosoft 420-90® available from Akzo Chemie Chemicals. Also suitable are phosphonium compounds, such as, for example, those disclosed in copending application U.S. Ser. No. 08/034,917, the disclosure of which is totally incorporated herein by reference, o-xylylenebis(triphenyl)phosphonium bromide, Aldrich #X110-5; heptyl triphenyl phosphonium bromide, Aldrich #37,753-8; dodecyl triphenyl phosphonium bromide, Aldrich #17,262-6; [3-(ethoxycarbonyl)-2-oxypropyl] triphenyl phosphonium chloride, Aldrich #42,424-2; [3-(ethoxycarbonyl)-2-propyl]triphenyl phosphonium bromide, Aldrich #34,985-2; benzyltriphenyl phosphonium bromide, Aldrich #43,005-6; (ethoxy carbonyl methyl) dimethyl sulfonium bromide, Aldrich #14,526-2; tetraoctyl phosphonium bromide, Aldrich #44,213-5; tetraethylammonium hexafluoro phosphate, Aldrich #43,411-6; tetrabutyl ammonium dihydrogen phosphate, Aldrich #44,710-2; tetramethyl ammonium hydrogen phthalate, Aldrich #43,832-4; (R)-(−)-3-pyrrolidinol hydrochloride, Aldrich #43,072-2; 1-propyl pyridinium bromide, Aldrich #41,288-0; 2-propylisoquinolinium bromide, Aldrich #41,287-2; 1-phenacyl pyridinium bromide, Aldrich #15,142-4; 1,3-didecyl-2-methyl imidazolinium chloride, Aldrich #43,378-0; bis(tetramethylammonium) carbonate, Aldrich #43,838-3; bis(tetrabutyl ammonium)sulfate, Aldrich #43,830-8; (2-acryloyloxy ethyl) (benzoylbenzyl)dimethylammonium bromide, Aldrich #40,632-5; (2-acryloyloxyethyl)trimethyl ammonium methyl sulfate, Aldrich #40,811-5; 2,5-dimethoxy-4-morpholino aniline dihydrochloride, Aldrich #43,936-3; 4-bromo piperidine hydrobromide, Aldrich #42,232-0; 3-amino-1H-isoindolehydrochloride, Aldrich #41,592-8; 2-amino-4'-methoxyacetophenone hydrochloride, Aldrich #41,594-4; (S)-(+)2-amino-3-cyclohexyl-1-propanol hydrochloride, Aldrich #43,226-1; and 2-amino-4'-bromoacetophenone hydrochloride, Aldrich #41,534-0.

The hydrophobic polymers of the second layer present on the top of the first antistatic layer are present in amounts of from about 35 parts to about 90 parts by weight and preferably from about 40 to about 85 parts by weight, and examples of these polymers include poly(vinyl formal), such as #012 available from Scientific Polymer Products, poly(vinyl butyral), such as #043, #511, #507, available from Scientific Polymer Products, vinyl alcohol-vinyl butyral copolymers, such as #381 available from Scientific Polymer Products, vinyl alcohol-vinyl acetate copolymers, such as #379 available from Scientific Polymer Products, vinyl chloride-vinyl acetate copolymers, such as #063, #068, #070, #422 available from Scientific Polymer Products, vinyl chloride-vinyl acetate-vinyl alcohol terpolymers, such as #064, #427, #428 available from Scientific Polymer Products, vinyl chloride-vinylidene chloride copolymers, such as #058 available from Scientific Polymer Products, vinylidene chloride-acrylonitrile copolymers, such as #395, #396 available from Scientific Polymer Products, cyanoethylated cellulose, such as #091 available from Scientific Polymer Products, cellulose acetate hydrogen phthalate, such as #085 available from Scientific Polymer Products, hydroxypropylmethyl cellulose phthalate, such as HPMCP available from Shin-Etsu Chemical, hydroxypropyl methyl cellulose succinate, such as HPMCS available from Shin-Etsu Chemical, cellulose triacetate, such as #031 available from Scientific Polymer Products, cellulose acetate butyrate, such as #077 available from Scientific Polymer Products, cellulose propionate, such as #2052 available from Scientific Polymer Products, polystyrene, such as #039A, #039D,

#845, #756 available from Scientific Polymer Products, poly(4-methylstyrene), such as #315, #593, #839 available from Scientific Polymer Products, poly($\alpha$-methylstyrene), such as #2055 available from Scientific Polymer Products, poly(tert-butylstyrene), such as #177 available from Scientific Polymer Products, poly(2-chlorostyrene), such as #777 available from Scientific Polymer Products, poly(3-chlorostyrene), such as #778 available from Scientific Polymer Products, poly(4-chlorostyrene), such as #257 available from Scientific Polymer Products, poly(2-bromostyrene), such as #775 available from Scientific Polymer Products, poly(3-bromostyrene), such as #776 available from Scientific Polymer Products, poly(4-bromostyrene), such as #212 available from Scientific Polymer Products, poly(4-methoxystyrene), such as #314 available from Scientific Polymer Products, poly(2,4,6-tribromostyrene), such as #166 available from Scientific Polymer Products, styrene-butylmethacrylate copolymers, such as #595 available from Scientific Polymer Products, styrene-acrylonitrile copolymers, such as #495 available from Scientific Polymer Products, styrene-allyl alcohol copolymers, such as #393, #394 available from Scientific Polymer Products, poly(2-vinyl pyridine), such as #813, #814 available from Scientific Polymer Products, poly(4-vinyl pyridine), such as #700, #840 available from Scientific Polymer Products, poly(2-vinyl pyridine-co-styrene), such as #319 available from Scientific Polymer Products, poly(4-vinyl pyridine-co-styrene), such as #416, #859 available from Scientific Polymer Products, poly(4-vinyl pyridine-co-butylmethacrylate), such as #312, #667, #858 available from Scientific Polymer Products, poly(vinyl toluene), such as #261 available from Scientific Polymer Products, poly(2-vinyl naphthalene), such as #163 available from Scientific Polymer Products, poly(methylmethacrylate), such as #037A, #037B, #037D, #307, #424, #689, available from Scientific Polymer Products, poly(ethyl methacrylate), such as #113, #308 available from Scientific Polymer Products, poly(isopropyl methacrylate), such as #476 available from Scientific Polymer Products, poly(phenyl methacrylate), such as #227 available from Scientific Polymer Products, poly(phenoxy ethyl methacrylate), such as #893 available from Scientific Polymer Products, poly(2-hydroxypropyl methacrylate), such as #232 available from Scientific Polymer Products, polyamide resin, such as #385, #386, #387, #388, #389, #390, available from Scientific Polymer Products, poly(p-phenylene ether-sulfone), such as #392 available from Scientific Polymer Products, polysulfones, such as #046 available from Scientific Polymer Products, aromatic ester carbonate copolymers, such as APE KLI-9306, APE KLI-9310 available from Dow Chemical Company, polycarbonates, such as #035 available from Scientific Polymer Products, polyesters, such as polyethylene terephthalate resins, such as those available as Rynite from E. I. DuPont de Nemours and Company, available as Petlon from Mobay Chemicals, available as Ropet from Rohm and Haas Company, and available as Petra from Allied Corporation; Aropol polyester resins such as #Q-6585, #7021, #7030, #7131, #7221, #7320-1, #7362, #7420, #7721, #8022, #8310, #8319, #8420, all being available from Ashland Chemical Company; Hetron polyester resins such as #72, #72-G, #72-L, #72-S, #92-AT, #92-FR, #92-FS, #197-3, #197-A, #197-AT, #197-P, #670-P, #700, #700, #670-C, #900, #922, #980, all being available from Ashland Chemical Company; polyarylate resins, such as Ardel D-100 available from Union Carbide Company, Durel available from Celanese Corporation; polybutylene terephthalate based ester resins, such as Gafite thermoplastic polyester resins, such as #1600-A, #1602-Z, #1602-F, all being available from GAF Corporation, Tenite and Eastman MB DA003 available from Eastman Performance Plastics, Hostadur available from Hoechst, Celanex available from Celanese Corporation, Valox available from General Electric Company, Pocan available from Mobay Chemical Company, Arnite A, Arnite B available from Akzo Plastics BV, Rynite available from E. I. DuPont de Nemours and Company Incorporated, Ultradur B4306, Ultradur B4520 available from BASF AG, unsaturated polyester resins, such as #40, #50, #188, #200-40-80DAP, #332-65-S, #433-70-S, #500, #600, #757-75-VTC, all being available from P. D. George Company; Cleartuf polyester resins, such as #1006, #7204, #7207, #7800G, #8002, #8006, #8009GG, #8401, #8403, all being available from Goodyear Chemicals; Vitel polyester resins, such as #PE-200, #PE-200D, #PE-222, #PE-307, VPE-4302A, VPE-4583A, VPE-4709A, VPE-4751 A, VPE-5006 A, VPE-5126A, VAR-5126A, VAR-5146A, VPE-5545A, VPE-5571A, VPE-5571AG, VPE-5802A, VPE-5829A, VPE-5833A, VPE-5987A, VPE-6054A, VPE-6104A, VAR-5571 AG, VPE-6158A, VPE-6159A, VPE-6467A, VPE-10,022A, VPE-10,035A, VPE-10,038A, all previously sold by Goodyear Chemicals; Flexclad polyester resins, such as #V PE-100, VPE-4670A, VPE-5253C, VAR-5825C, VAR-5825F, VPE-6402B, all previously sold by Goodyear Chemicals; Vituf polyester resins, such as #5901, #6200, #6400, #6408, #6409, #7004, #7006, #7201, #9501, #9502, #9503, #9504, all previously sold by Goodyear Chemicals; new Vitel 1000 series, Vitel 2000 series, Vitel 3000 series, Vitel 4000 series, Vitel 5000 series presently being sold by Shell Chemical Company, Polymac polyesters, such as #918, #919, #920, #922, #923, #924, #925, #927, #929, #930, #931, #981, all being available from Mcwhorter; Bisphenol-A fumarate polyester resins, such as #E-750, #E-750-1, #E-751, #E-752, #E-753, #E-764, #E-5297, all being available from Owens-Corning Fiberglass Corporation; Rosin modified maleic polyester resins, such as #PA-55-004, #PA-55-01 1, #PA-55-012, #PA-55-013, #PA-55-023, #PA-55-024, #PA-55-025, #PA-55-030, #PA-55-048, #PA-55-164, #PA-55-360, #PA-55-361, #PA-55-364, all being available from Polymer Applications Incorporated; polyester resins S-series, and flame retardant F-series, all being available from Silmar Division of Vistron Corporation; polyester adipate, such as Merrol P-Series, such as #P-6303, #P-6310, #P-6311, #P-6320, #P-6403, #P-6410, #P-6420, #P-6422, #P-6424, available from Merrand International Corporation; polyester azelate, available as Merrol #P-9500 and #P-1030LV from Merrand International Corporation; polyester glutarate, available as Merrol #P-5510, from Merrand International Corporation; polyester nylonate, available as Merrol #P-5511 from Merrand International Corporation; polyester phthalate, available as Merrol #P-8425 from Merrand International Corporation; polyester polyol, available as Terate #202, #203, #204 from Hercules Incorporated; low melt polyesters including poly(ethylene adipate), such as #147 available from Scientific Polymer Products, poly(ethylene succinate), such as #149 available from Scientific Polymer Products, poly(ethylene azelate), such as #842 available from Scientific Polymer Products, poly(1,4-butylene adipate), such as #150 available from Scientific Polymer Products, poly (trimethylene adipate), such as #594 available from Scientific Polymer Products, poly(trimethylene glutarate), such as #591 available from Scientific Polymer Products, poly (trimethylene succinate), such as #592 available from Scientific Polymer Products, poly(hexamethylene succinate), such as #124 available from Scientific Polymer Products, poly(diallyl phthalate), such as #010 available from Scientific Polymer Products, poly(diallyl isophthalate), such as #011 available from Scientific Polymer Products, thiodipropionate polyester, available as TDP 2000 from Eastman Chemicals Company; polyester resin, available as Admex Series from Sherex Polymer Incorporated; Resapol HT linear polyester, available from Rezana Brazil; crosslinked Resapol HT with a degree of crosslinking ranging between 5 to about 40 percent, obtained via reactive extrusion process as described in U.S. Pat. No. 5,227,460; polyester-ether resins, such as those available as Hytrel from E. I. DuPont de Nemours and Company, available as Lomod from General Electric Company, available as Gaflex from GAF Corporation, available as Kodar PETG 6763 and Kodar CTPI from Eastman Chemicals, available as Arnitel from Akzo Plastics BV, available as Pelprene from Toyobo Company, available as Ecdel from Eastman Kodak Company; and poly(2,6-dimethyl p-phenylene oxide), such as #126 available from Scientific Polymer Products.

The toner wetting/spreading agents are present in amounts of from about 45 parts by weight to about 1 part by weight and preferably from about 40 to about 5 parts by weight.

The toner wetting/spreading agents are, for example, derived from oxyalkylene-polymers including poly (oxymethylene), such as #009 available from Scientific Polymer Products, poly(oxyethylene) or poly(ethylene oxide), such as POLYOX WSRN-3000 available from Union Carbide Corporation, ethylene oxide/propylene oxide copolymers, such as ethylene oxide/propylene oxide/ ethylene oxide triblock copolymer, such as Alkatronic EGE-31-1 available from Alkaril Chemicals, propylene oxide/ ethylene oxide/propylene oxide triblock copolymers, such as Alkatronic PGP 3B-1 available from Alkaril Chemicals, tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8 available from BASF Corporation, ethylene oxide/2-hydroxy ethylmethacrylate/ ethylene oxide and ethyleneoxide/ hydroxypropylmethacrylate/ethylene oxide triblock copolymers, which can be synthesized via free radical polymerization of hydroxyethyl methacrylate or hydroxypropyl methacrylate with 2-aminoethanethiol using α,α'-azobisisobutyronitrile as initiator, and reacting the resulting amino-semitelechelic oligo-hydroxyethyl methacrylate or amino-hydroxypropyl methacrylate with an isocyanate-polyethylene oxide complex in chlorobenzene at 0° C., and precipitating the reaction mixture in diethylether, filtering and drying in vacuum, ethylene oxide/4-vinyl pyridine/ ethylene oxide triblock copolymers, which can be synthesized via anionic polymerization of 4-vinyl pyridine with sodium naphthalene as initiator at −78° C., and then adding ethylene oxide monomer, the reaction being carried out in an explosion proof stainless steel reactor, ionene/ethylene oxide/ionene triblock copolymers, which can be synthesized via quaternization reaction of one end of each 3-3 ionene with the halogenated (preferably brominated) poly (oxyethylene) in methanol at about 40° C., ethylene oxide/ isoprene/ethylene oxide triblock copolymers, which can be synthesized via anionic polymerization of isoprene with sodium naphthalene in tetrahydrofuran as solvent at −78° C., and then adding monomer ethylene oxide and polymerizing the reaction for three days, after which time the reaction is quenched with methanol, the ethylene oxide content in the aforementioned triblock copolymers being from about 20 to about 70 percent by weight and preferably about 50 percent by weight, and the like, epichlorohydrinethyleneoxide copolymer such as #155 available from Scientific Polymer Products, and mixtures thereof.

The toner wetting/spreading agent of the second layer can also be selected from the group consisting of nitrile, aniline, pyrimidine, isothiocyanate, cinnamate group containing monomeric compounds capable of exhibiting liquid crystalline behavior under suitable conditions of temperature, pressure, electric or magnetic fields thereby producing a variety of colors and an optional polymeric liquid crystalline material and mixtures thereof. These liquid crystalline materials are present in amounts of from about 30 parts by weight to about 1 part by weight and preferably from about 30 parts by weight to about 5 parts by weight.

Examples of suitable monomeric liquid crystalline materials for use in the toner receiving layer include:

(a) nematic liquid crystalline materials such as those derived from the nitrile group containing compounds, such as (1) 4-(trans-4-pentyl cyclohexyl) benzonitrile (Aldrich #37,011-8), (2) 4'-pentyl-4'-biphenyl carbonitrile (Aldrich #32,851-0), (3) 4'-(pentyloxy)-4-biphenylcarbonitrile (Aldrich #32,852-9), (4) 4'-hexyl-4-biphenyl carbonitrile, (Aldrich #33,864-8), (5) 4'-(hexyloxy)-4-biphenyl carbonitrile (Aldrich #33,865-6), (6) 4'-heptyl-4-biphenyl carbonitrile (Aldrich #33,081-7), (7) 4'-heptyloxy-4-biphenyl carbonitrile (Aldrich #33,866-4), (8) 4'-octyl-4-biphenyl carbonitrile (Aldrich #33,868-0), and (9) 4'-(octyloxy)-4-biphenyl carbonitrile (Aldrich #33,867-2); those derived from the isothiocyanate and carboxylate group containing compounds, such as (1) 1-isothiocyanato-4-(trans-4-propyl cyclohexyl) benzene (Aldrich #36,629-3), (2) 1-(trans-4-hexyl cyclohexyl)-4-isothiocyanato benzene (Aldrich #36,685-4), (3) 1-(4-trans-hexyl cyclohexyl)-4-[2-(4-isothiocyanatophenyl)ethyl]benzene (Aldrich #37,725-2), (4) 1-isothiocyanato-4-(trans-4-octylcyclohexyl)benzene (Aldrich #36,686-2), (5) 4-isothiocyanatophenyl-4-pentabicyclo[2.2.2]octane-1 carboxylate (Aldrich #37,005-3), (6) (R)-4-[(1-methyl heptyloxy)carbonyl]phenyl-4'-octyloxy-4-biphenyl carboxylate (Aldrich #40,886-7), and (7) (S)-4-[(1-methylheptyloxy)carbonyl]phenyl-4'-octyloxy-4-biphenylcarboxylate (Aldrich #40,885-9); those derived from the aniline group containing compounds, such as (1) 4-methoxybenzylidene-4'-n-butylaniline (Aldrich #15,822-4); (2) 4,4'-dihexylazoxybenzene (Aldrich #36,680-3); (3) 4,4'-diheptylazoxybenzene, (Aldrich #36,678-1); and the like;

(b) smectic liquid crystalline materials, such as (1) (−)2-methylbutyl-4-(4'-methoxy benzylidene-amino)cinnamate, a noncholesteryl chiral compound {CAS #24140-30-5}, (2) (S)-(+)-2-methylbutyl-4-(4-decyloxy benzylidene-amino) cinnamate (Aldrich #32,476-6); (3) ethyl-4-ethoxybenzyl-4'-amino cinnamate {CAS #28,63-94-7}; (4) 2-(4-pentylphenyl)-5-(4-pentyloxyphenyl)pyrimidine {CAS #34913-070}; (5) 4-[(R)-(−)2-chloro-3-methylbutyryloxy] phenyl-4-(decyloxy)benzoate (Aldrich #32,854-5); (6) 4-[(S)-(+)2-chloro-3-methyl butyryl oxy]phenyl-4-(decyloxy) benzoate (Aldrich #32,855-3); (7) 4-[(S)-(+)-(4-methyl hexyl) oxy]phenyl-4-(decyloxy)benzoate, (Aldrich #32,792-1); (8) 4-[(S)-(-)-2-ethoxypropoxy] phenyl-4-(decyloxy) benzoate, (Aldrich #32,792-1); and (9) 4-hexylbenzoic acid; and (c) cholesteryl liquid crystalline materials, such as (1) cholesteryl heptanoate (Aldrich #C7,780-5), (2) cholesteryl octanoate (Aldrich #12,525-3), (3) cholesteryl nonanoate (Aldrich #C7,880-1), (4) cholesteryl palmitate (Aldrich #C7, 860-7), (5) cholesteryl palmitate (Aldrich #C7,860-7), (6)

cholesteryl oleyl carbonate (Aldrich #15,115-7), (7) cholesteryl stearate (Aldrich #C7,940-9), (8) cholesteryl hydro cinnamate (Aldrich #C7,790-2), (9) cholesteryl acetate (Aldrich #15,111-4), (10) cholesteryl chloroformate (Aldrich #C7,700-7); and the like The toner receiving second layers of the present invention contain lightfastness agents present in amounts of from about 15 parts by weight to about 1 part by weight. These lightfastness agents are derived from (1) UV absorbing compounds, (2) antioxidant compounds, (3) antiozonant compounds, and (4) mixtures thereof. When a mixture of lightfastness compounds includes a UV absorbing compound and an antioxidant compound, the UV compound is present in amounts of about 10 parts by weight to about 0.5 part by weight and the antioxidant compound is present in amounts of about 5 parts by weight to about 0.5 part by weight. When a mixture of lightfastness compounds includes a UV absorbing compound, an antioxidant compound and an antiozonant compound, the UV compound is present in amounts of about 9 parts by weight to about 0.5 part by weight, the antioxidant compound is present in amounts of about 3 parts by weight to about 0.25 part by weight, and the antiozonant compound is present in amounts of about 3 parts by weight to about 0.25 part by weight.

The lightfastness agents are described in the copending application U.S. Ser. No. 656,814, the disclosure of which is totally incorporated herein by reference. The preferred lightfastness agents for the present application include UV absorbing compounds, such as poly[N,N-bis(2,2,6,6-tetramethyl-4-piperidinyl)-1,6-hexanediamine-co-2,4-dichloro-6-morpholino-1,3,5-triazine], available as Cyasorb UV-3346, #41,324-0, from Aldrich Chemical Company, poly(4-hydroxy-2,2,6,6-tetramethyl-1-piperidine ethanol/dimethyl succinic acid), available as Tinuvin 622LD from Ciba-Geigy Corporation, poly(3,5-di-tert-butyl-4-hydroxy hydrocinnamic acid ester)/1,3,5-tris(2-hydroxyethyl)-5-triazine-2,4,6(1 H,3H,5H)-trione, available as Good-rite 3125 from Goodrich Chemicals, 2-hydroxy-4-(octyloxy) benzophenone, available as Cyasorb UV-531, #41,315-1, from Aldrich Chemical Company, 2-(4-benzoyl-3-hydroxy phenoxy)ethyl acrylate, Cyasorb UV-416, #41,321-6, available from Aldrich Chemical Company, and the like; lightfast antioxidant compounds, such as didodecyl-3,3'-thiodipropionate, available as Cyanox, LTDP, #D12,840-6, from Aldrich Chemical Company; ditridecyl-3,3'-thiodipropionate, available as Cyanox 711, #41,311-9, from Aldrich Chemical Company; ditetradecyl-3,3'-thiodipropionate, available as Cyanox, MTDP, #41,312-7, from Aldrich Chemical Company; dicetyl-3,3'-thiodipropionate, available as Evanstab 16 from Evans Chemetics Corporation; antiozonant compounds, such as N-(1,3-dimethylbutyl)-N'-phenyl-phenylenediamine, available as Santoflex 13 from Monsanto Chemicals, N,N'-di(2-octyl)-p-phenylene diamine, available as Antozite-1 from Vanderbilt Corporation, N,N'-bis(1,4-dimethyl pentyl)-p-phenylene diamine, available as Santoflex 77 from Monsanto Chemicals, and mixtures thereof.

Examples of suitable biocides useful for the second toner receiving layer and the third pigmented layer of the papers of the present invention are described in copending application U.S. Ser. No. 196,605, the disclosure of which is totally incorporated herein by reference, and are present in, for example, amounts of from about 4 parts by weight to about 1 part by weight and preferably from about 3 parts by weight to about 1 part by weight. The preferred biocides for use in the present application include (A) nonionic biocides, such as (1) 2-hydroxypropylmethane thiosulfonate (Busan 1005 available from Buckman Laboratories Inc.), (2) 2-(thio cyanomethyl thio) benzothiazole (Busan 30WB, 72WB available from Buckman Laboratories Inc.), (3) methylene bis(thiocyanate) (Metasol T-10 available from Calgon Corporation, AMA-110 available from Vinings Chemical Company, Vichem MBT available from Vineland Chemical Company, Aldrich 10,509-0), (B) anionic biocides, such as (1) anionic potassium N-hydroxymethyl-N-methyl-dithiocarbamate (available as BUSAN 40 from Buckman Laboratories Inc.), (2) an anionic blend of N-hydroxymethyl-N-methyl dithiocarbamate (80 percent by weight) and sodium 2-mercapto benzothiazole (20 percent by weight) (available as BUSAN 52 from Buckman Laboratories Inc.), (C) cationic biocides, such as (1) cationic poly(oxyethylene(dimethylamino)-ethylene (dimethylamino)ethylene dichloride) (Busan 77 available from Buckman Laboratories Inc.), (2) a cationic blend of methylene bisthiocyanate and dodecyl guanidine hydrochloride (available as SLIME TROL RX-31, RX-32, RX-32P, RX-33, from Betz Paper Chem Inc.)

The toner receiving coating composition also contains fillers and pigment materials present in amounts of, for example, from about 1 part by weight to about 7 parts by weight and preferably from about 2 parts by weight to about 5 parts by weight described in U.S. Ser. No.656,814, the disclosure of which is totally incorporated herein by reference. The preferred fillers include hollow microspheres including Eccospheres MC-37 (sodium borosilicate glass), Eccospheres FTD 202 (high silica glass, 95 percent $S10_2$), and Eccospheres Sl (high silica glass, 98 percent $S10_2$), all available from Emerson and Cuming Inc.; zirconium oxide (SF-EXTRA available from Z-Tech Corporation); colloidal silicas, such as Syloid 74 available from Grace Company (preferably present, in one embodiment, in an amount of from about 10 to about 70 percent by weight percent); amorphous silica available as Flow-Gard CC 120, Flow-Gard CC 140, Flow-Gard CC 160 from PPG Industries; titanium dioxide (available as Rutile or Anatase from NL Chem Canada, Inc.); hydrated alumina (Hydrad TMC-HBF, Hydrad TM-HBC available from J. M. Huber Corporation); barium sulfate (K. C. Blanc Fix HD80 available from Kali Chemie Corporation); calcium carbonate (Microwhite Sylacauga Calcium Products); high brightness clays (such as Engelhard Paper Clays); calcium silicate (available from J. M. Huber Corporation); cellulosic materials insoluble in water or any organic solvents (such as those available from Scientific Polymer Products); blends of calcium fluoride and silica, such as Opalex-C available from Kemira O. Y; zinc oxide, such as Zoco Fax 183,available from Zo Chem; blends of zinc sulfide with barium sulfate, such as Lithopane available from Schteben Company; barium titanate, #20, 810-8 available from Aldrich Chemicals; antimony oxide #23,089-8 available from Aldrich Chemicals, and mixtures thereof. Brightener fluorescent pigments of Coumarin derivatives, such as Formula #633 available from Polymer Research Corporation of America, and fluorescent pigments of oxazole derivatives, such as Formula #733 available from Polymer Research Corporation of America, can enhance color mixing and assist in improving print-through in papers of the present invention.

The third layer coating composition in contact with the backside of the substrate is present in any effective thickness. Typically, the total thickness of the second coating layer is from about 0.1 to about 25 microns and preferably from about 0.5 to 10 microns, although the thickness may be outside of these ranges. In the third layer coating composition, the binder is present in amounts of from about 10 parts by weight to about 50 parts by weight and preferably from about 15 parts by weight to about 46 parts by weight, the antistatic agent is present in an amount of from about 1 parts by weight to about 20 parts by weight and preferably from about 5 parts by weight to about 15 parts by weight, the lightfastness agents are present in amounts of from about 1 parts by weight to about 10 parts by weight and preferably from about 2 parts by weight to about 10 parts by weight, the pigment is present in amounts of from about 87 parts by weight to about 26 parts by weight and preferably from about 77 parts by weight to about 25 parts by weight, and the biocide compound is present in amounts of from about 1 part by weight to about 4 parts by weight.

The third layer polymers include water dispersible polymers present in amounts of from about 10 parts by weight to about 50 parts by weight and preferably from about 15 parts by weight to about 46 parts by weight, and include (A) latex polymers (polymers capable of forming a latex can be a polymer that forms in water or in an organic solvent a stable colloidal system in which the disperse phase is polymeric). Examples of suitable latex-forming polymers include rubber latex, such as neoprene available from Serva Biochemicals, acrylic emulsion latex, such as Rhoplex B-15J, Rhoplex P-376 from Rohm and Haas Company Synthetic Rubber Latex 68-302 from Reichhold Chemicals Inc., polyester resins such as biodegradable polyester resins, such as polyglycolide available as Dexon from American Cyanamid Company, polyesters of lactic acid such as polyglactin 910, Vicryl XLG, both being available from Ethicon Company; water soluble polyesters such as titanium derivatives of polyesters, such as Tyzor available from E. I. DuPont de Nemours and Company; polyester latex such as Eastman AQ 29D available from Eastman Chemical Company; cationic, anionic, and nonionic styrene-butadiene latexes (such as that available from Gen Corporation Polymer Products, such as RES 4040 and RES 4100 available from Unocal Chemicals, and such as DL 6672A, DL6638A, and DL6663A available from Dow Chemical Company), ethylene-vinylacetate latex (such as Airflex 400 available from Air Products and Chemicals Inc.), vinyl acetate-acrylic copolymer latexes, such as synthemul 97-726 available from Reichhold Chemical Inc., Resyn 25-1110 and Resyn 25-1140 available from National Starch Company, and RES 3103 available from Unocal Chemicals, as well as mixtures thereof; (B) solvent soluble polymers, such as poly(hydroxyalkylacrylates), wherein alkyl is methyl, ethyl, or propyl, including poly(2-hydroxyethyl acrylate), such as #850 available from Scientific Polymer Products, and poly(hydroxypropyl acrylate), such as #851 from Scientific Polymer Products, poly(n-hexyl methacrylate), such as #217 available from Scientific Polymer Products, poly(2-ethylhexyl methacrylate), such as #229 available from Scientific Polymer Products, poly(n-decylmethacrylate), such as #884 available from Scientific Polymer Products, poly(isodecyl methacrylate), such as #220 available from Scientific Polymer Products; polyalkylenes and their copolymers wherein alkyl has from 2 to about 6 carbon atoms, including ethyl, propyl, butyl, including polyethylene, such as #041, #042, #535, #536, #558, #560 available from Scientific Polymer Products, polypropylene, such as #130, #780, #781, #782, #783 available from Scientific Polymer Products, poly(1-butene), such as #128, #337, #338,available from Scientific Polymer Products, ethylene-propylene copolymer, such as #454, #455 available from Scientific Polymer Products, ethylene-ethylacrylate copolymer, such as #358 available from Scientific Polymer Products, ethylene-propylene-diene terpolymer, such as #350, #360, #448, #449, available from Scientific Polymer Products; vinylalkylether polymers including polyvinylmethylethe, such as #450 available from Scientific Polymer Products, polyvinylisobutylether, such as #425 available from Scientific Polymer Products; and mixtures thereof.

The filler components, lightfastness agents, biocides, antistatic agents of the third layer are selected from those illustrated herein. Antistatic agents of the third layer may also be selected from (1) esters of succinic acid, such as sulfosuccinic acid (Alkasurf SS-O-75 [sodium dioctyl sulfosuccinate], Alkasurf SS-DA4-HE [ethoxylated alcohol sulfosuccinate], Alkasurf SS-L7DE [sodium sulfosuccinate ester of lauric diethanol amide], Alkasurf SS-L-HE [sodium lauryl sulfosuccinate], Alkaril Chemicals); (2) esters of sulfonic acid (Alkasurf CA, [calcium dodecyl benzene sulfonate], Alkasurf 1 PAM [isopropylamine dodecyl benzene sulfonate], Alkaril Chemicals); and (3) alkyl amines (Alkamide SDO [soya diethanol amide], Alkamide CDE [coco diethanol amide], Alkamide CME [coco monoethanol amide], Alkamide L9DE [lauric diethanol amide], Alkamide L7Me [lauric monoethanol amide], Alkamide L1PA [lauric monoisopropylamide], Alkaril Chemicals).

The coating compositions of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multilayers are to be applied simultaneously. In the multilayer slot coating, the coating solutions form a liquid stack in the gap where the liquids come in to contact with the moving web to form a coating. The stability of the interface between the two layers depends on wet thickness, density and viscosity ratios of both layers which need to be kept as close to one as possible. Once the desired amount of coating has been applied to the web, the coating is dried, typically at from about 25° to about 100° C. in an air dryer.

The Hercules size values recited herein were measured on the Hercules sizing tester (available from Hercules Incorporated) as described in TAPPI STANDARD T-530 pm-83, issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined (80 percent) percentage of its original reflectance.

The porosity values recited herein were measured with a Parker Print-Surf porosimeter, which records the volume of air per minute flowing through a sheet of paper. The edge raggedness values recited in the present application were measured using an Olympus microscope equipped with a camera capable of enlarging the recorded ink jet images. The edge raggedness value is the distance in millimeters for the intercolor bleed on a checkerboard pattern.

The coated xerographic photographic papers of the present invention exhibit reduced curl upon being printed with toners. Generally, the term "curl" refers to the distance between the base line of the arc formed by recording sheet when viewed in cross-section across its width (or shorter dimension, for example 8.5 inches in an 8.5 by 11 inch sheet, as opposed to length, or longer dimension, for example 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

The lightfastness values of the xerographic images were measured in the Mark-V Lightfastness Tester obtained from Microscal Company, London, England.

The gloss values recited herein were obtained on a 75° Glossmeter, Glossgard, from Pacific Scientific (Gardner/Neotec Instrument Division). The edge raggedness values recited in the present application were measured using an Olympus microscope equipped with a camera capable of enlarging the recorded xerographic images. The edge raggedness value is the distance in millimeters for the intercolor bleed on a checkerboard pattern.

The optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Coated xerographic photographic papers were prepared by the solvent extrusion process (single side each time initially) on a Faustel Coater using a two slot die by providing for each a paper base sheet (roll form) with a thickness of 100 microns with a Hercules size value of 1,000 seconds and coating the base sheet simultaneously with two polymeric layers where the first layer in contact with the substrate was comprised of a mixture of antistatic polymethyl acrylate trimethyl ammonium chloride latex, HX-42-1 obtained from Interpolymer Corporation, 90 percent by weight, and benzyltriphenyl phosphonium bromide, Aldrich #43,005-6, 10 percent by weight, the mixture being present in a concentration of 20 percent by weight in methanol; and the second layer in contact with the first layer was comprised of 85.0 parts by weight vinyl alcohol-vinyl acetate copolymer, #379 available from Scientific Polymer Products, 8.0 parts by weight of poly(ethylene oxide), POLYOX WSRN-3000 available from Union Carbide Corporation, 2.0 parts by weight of poly[N,N-bis(2,2,6,6-tetramethyl-4-piperidinyl)-1,6-hexane diamine-co-2,4-dichloro-6-morpholino-1,3,5-triazine) (Cyasorb UV-3346, #41,324-0, available from Aldrich Chemical Company) and 2.0 parts by weight of didodecyl-3,3'-thiodipropionate, 1.0 part by weight of nonionic biocide, 2-hydroxypropylmethane thiosulfonate (Busan 1005 available from Buckman Laboratories Inc.), and 2.0 parts by weight of colloidal silica, Syloid 74 available from W. R. Grace and Company, which composition was present in a concentration of 10 percent by weight in methanol. Subsequent to air drying at 100° C. and monitoring the difference in weight prior to and subsequent to coating, the dried paper base sheet rolls contained 1 gram, 11 microns in thickness, of the toner receiving layer. Rewinding the coated side of the paper base sheet (roll form) on to an empty core and using these rolls, the uncoated side of the paper base sheet was coated with a composition comprised of 50 percent by weight of crosslinked Resapol HT with a degree of crosslinking 10 percent, obtained via reactive extrusion process as described in U.S. Pat. No. 5,227,460, the disclosure of which is totally incorporated herein by reference; 5.0 percent by weight of the antistatic agent commercially available from Alkaril Chemicals as Alkasurf SS-L7DE, 2 percent by weight of UV absorbing compound 2-(4-benzoyl-3-hydroxyphenoxy) ethylacrylate (Cyasorb UV-416, #41,321-6, available from Aldrich Chemical Company), and 2 percent by weight of an antioxidant compound didodecyl-3,3'-thiodipropionate (Cyanox, LTDP, #D12,840-6, available from Aldrich Chemical Company), 40.0 percent by weight of microspheres Miralite 177 (vinylidene chloride-acrylonitrile available from Pierce & Stevens Chemical Corporation); 1.0 percent by weight of nonionic biocide 2-hydroxypropylmethane thiosulfonate (Busan 1005 available from Buckman Laboratories Inc.), which composition was present in a concentration of 10 percent by weight in toluene. Subsequent to air drying at 100° C. and monitoring the difference in weight prior to and subsequent to coating, the dried coated xerographic photographic papers contained 1 gram, 10 microns in thickness, of polyester traction controlling layer. The coated xerographic photographic papers were cut from this roll in sizes of 8.5 by 11.0 inch cut sheets.

These coated xerographic photographic papers were utilized in a Xerox 5760 MajestiK™ Digital Color Copier with a means for transporting polyester resin based toners, and developed images were obtained on the toner receiving side of the coated xerographic photographic papers. These images had a gloss of 90 units, and optical density values of 1.37 (cyan), 1.23 (magenta), 0.87 (yellow) and 1.54 (black). These images were 100 percent waterfast when washed with water for 2 minutes at 50° C. and 100 percent lightfast for a period of three months without any change in their optical density. These coated xerographic photographic papers were also utilized in a Xerox 5760 MajestiK™ Digital Color Copier transporting polyester resin based toners, and images were obtained on the traction controlling side of the coated xerographic photographic papers. These images had a gloss of 50 units, and optical density values of 1.35 (cyan), 1.20 (magenta), 0.87 (yellow) and 1.50 (black). These images were 100 percent waterfast, when washed with water for 2 minutes at 50° C. and 100 percent lightfast for a period of three months without any change in their optical density.

EXAMPLE II

Coated xerographic photographic papers were prepared by the solvent extrusion process (single side each time initially) on a Faustel Coater using a two slot die by providing for each a paper base sheet (roll form) with a thickness of 100 microns with a Hercules size value of 1,000 seconds and coating the base sheet simultaneously with two polymeric layers where the first layer in contact with the substrate was comprised of a mixture of antistatic material polymethyl acrylate trimethyl ammonium chloride latex, HX-42-1 obtained from Interpolymer Corporation, 90 percent by weight, and tetra methyl ammonium hydrogen phthalate, Aldrich #43,832-4, 10 percent by weight, the mixture being present in a concentration of 20 percent by weight in methanol and the second layer in contact with the first layer was comprised of 85.0 parts by weight of hydroxypropyl methyl cellulose succinate, HPMCS available from Shin-Etsu Chemical; 8.0 parts by weight of 4-(trans-4-pentyl cyclohexyl) benzonitrile (Aldrich #37,011-8), 2.0 parts by weight of poly[N,N-bis(2,2,6,6-tetramethyl-4-piperidinyl)-1,6-hexane-diamine-co-2,4-dichloro-6-morpholino-1,3,5-triazine) (Cyasorb UV-3346, #41,324-0, available from Aldrich Chemical Company), 2.0 parts by weight of didodecyl 3,3'-thiodipropionate, 1.0 part by weight of nonionic biocide 2-hydroxypropylmethane thiosulfonate (Busan 1005 available from Buckman Laboratories Inc.), 2.0 parts by weight of colloidal silica, Syloid 74 available from W. R. Grace and Company, which composition was present in a concentration of 10 percent by weight in methanol. Subsequent to air drying at 100° C. and monitoring the difference in weight prior to and subsequent to coating, the dried paper base sheet rolls contained 1 gram, 11 microns in thickness, of the toner receiving layer. Rewinding the coated side of the paper base sheet (roll form) on to an empty core and using these rolls, the uncoated side of the paper base sheet was coated with a composition comprised of 50 percent by weight of crosslinked Resapol HT, with a degree of crosslinking 30 percent, obtained via reactive extrusion process as described in U.S. Pat. No. 5,227,460; 5.0 percent by weight of the antistatic agent commercially available from Alkaril Chemicals as Alkasurf SS-L7DE, 2 percent by weight of the UV absorbing compound 2-(4-benzoyl-3-hydroxyphenoxy) ethylacrylate (Cyasorb UV-416, #41,321-6, available from Aldrich Chemical Company), 2 percent by weight of the antioxidant compound didodecyl-3,3'-thiodipropionate (Cyanox, LTDP, #D12,840-6, available from Aldrich Chemical Company), 40.0 percent by weight of microspheres Miralite 177 (vinylidene chloride-acrylonitrile) available from Pierce & Stevens Chemical Corporation; 1.0 percent by weight of nonionic biocide 2-hydroxypropylmethane thiosulfonate (Busan 1005 available from Buckman Laboratories Inc.), which composition was present in a concentration of 10 percent by weight in toluene. Subsequent to air drying at 100° C. and monitoring the difference in weight prior to and subsequent to coating, the dried coated xerographic photographic papers contained 1 gram, 10 microns in thickness, of polyester traction controlling layer. The coated xerographic photographic papers were cut from this roll into 8.5 by 11.0 inch cut sheets.

These coated xerographic photographic papers were utilized in a Xerox 5760 MajestiK™ Digital Color Copier transporting polyester resin based toners, and developed images were obtained on the toner receiving side of the photographic paper. These images had gloss values of 95, and optical density values of 1.45 (cyan), 1.28 (magenta), 0.89 (yellow) and 1.50 (black). These images were 100 percent waterfast when washed with water for 2 minutes at 50° C. and 100 percent lightfast for a period of three months without any change in their optical density. These coated xerographic photographic papers were utilized in a Xerox 5760 MajestiK™ Digital Color Copier carrying polyester resin based toners, and images were obtained on the traction controlling side of the photographic paper. These images had gloss values of 55, and optical density values of 1.40 (cyan), 1.25 (magenta), 0.87 (yellow) and 1.45 (black). These images were 100 percent waterfast when washed with water for 2 minutes at 50° C. and 100 percent lightfast for a period of three months without any change in their optical density.

EXAMPLE III

Coated xerographic photographic papers were prepared by the solvent extrusion process (single side each time initially) on a Faustel Coater using a one slot die by providing for each a paper base sheet (roll form) with a thickness of 100 microns with a Hercules size value of 1,000 seconds, and coating the base sheet with a polymeric layer in contact with the substrate comprised of a mixture of antistatic material polymethyl acrylate trimethyl ammonium chloride latex, HX-42-1 obtained from Interpolymer Corporation, 90 percent by weight, and 1-propyl pyridinium bromide, Aldrich #41,288-0, 10 percent by weight, the mixture being present in a concentration of 20 percent by weight in methanol. Subsequent to air drying at 100° C. and monitoring the difference in weight prior to and subsequent to coating, the dried paper base sheet rolls contained 0.5 gram, 5 microns in thickness, of the antistatic layer. This first antistatic layer was further overcoated with a toner receiving layer comprised of 85.0 parts by weight of Vitel 2700, available from Shell Chemical Company, 8.0 parts by weight of (S)-(+)-2-methylbutyl-4-(4-decyloxy benzylidene-amino)cinnamate (Aldrich #32,476-6), 2.0 parts by weight of poly[N,N-bis(2,2,6,6-tetramethyl-4-piperidinyl)-1,6-hexane-diamine-co-2,4-dichloro-6-morpholino-1,3,5-triazine) (Cyasorb UV-3346, #41,324-0, available from Aldrich Chemical Company), 2.0 parts by weight of didodecyl 3,3'-thiodipropionate, 1.0 part by weight of nonionic biocide 2-hydroxypropylmethane thiosulfonate (Busan 1005 available from Buckman Laboratories Inc.), 2.0 parts by weight of colloidal silica, Syloid 74 available from W. R. Grace and Company, which composition was present in a concentration of 10 percent by weight in toluene. Subsequent to air drying at 100° C. and monitoring the difference in weight prior to and subsequent to coating, the dried paper base sheet rolls contained 1 gram, 11 microns in thickness, of the toner receiving layer. Rewinding the coated side of the paper base sheet (roll form) on to an empty core and using these rolls, the uncoated side of the paper base sheet were coated with a composition comprised of 50 percent by weight of crosslinked Resapol HT, with a degree of crosslinking 30 percent, obtained via reactive extrusion process as described in U.S. Pat. No. 5,227,460; 5.0 percent by weight of the antistatic agent commercially available from Alkaril Chemicals as Alkasurf SS-L7DE, 2 percent by weight of the UV absorbing compound 2-(4-benzoyl-3-hydroxyphenoxy)ethylacrylate (Cyasorb UV-416, #41,321-6, available from Aldrich Chemical Company), and 2 percent by weight of the antioxidant compound didodecyl-3,3'-thiodipropionate (Cyanox, LTDP,

#D12,840-6, available from Aldrich Chemical Company), 40.0 percent by weight of microspheres Miralite 177 (vinylidene chloride-acrylonitrile available from Pierce & Stevens Chemical Corporation); 1.0 percent by weight of nonionic biocide 2-hydroxypropylmethane thiosulfonate (Busan 1005 available from Buckman Laboratories Inc.), which composition was present in a concentration of 10 percent by weight in toluene. Subsequent to air drying at 100° C. and monitoring the difference in weight prior to and subsequent to coating, the dried coated xerographic photographic papers contained 1 gram, 10 microns in thickness, of polyester traction controlling layer. The coated xerographic photographic papers were cut from this roll into 8.5 by 11.0 inch cut sheets.

These coated xerographic photographic papers were utilized in a Xerox 5760 MajestiK™ Digital Color Copier transporting polyester resin based toners, and developed images were obtained on the toner receiving side of the photographic paper. These images had gloss values of 95, and optical density values of 1.40 (cyan), 1.32 (magenta), 0.89 (yellow) and 1.56 (black). These images were 100 percent waterfast when washed with water for 2 minutes at 50° C. and 100 percent lightfast for a period of three months without any change in their optical density . These coated xerographic photographic papers were utilized in a Xerox 5760 MajestiK™ Digital Color Copier carrying polyester resin based toners, and images were obtained on the traction controlling side of the photographic paper. These images had gloss values of 65, and optical density values of 1.35 (cyan), 1.30 (magenta), 0.89 (yellow) and 1.53 (black). These images were 100 percent waterfast when washed with water for 2 minutes at 50° C. and 100 percent lightfast for a period of three months without any change in their optical density.

Other embodiments and modifications of the present invention may occur to those skilled in the art subsequent to a review of the information presented herein; these embodiments and modifications, as well as equivalents thereof, are also included within the scope of this invention.

What is claimed is:

1. A coated xerographic photographic paper comprised of (1) a substrate, (2) an antistatic layer in contact with one surface of the substrate, (3) a toner receiving layer in contact with the the antistatic layer and comprised of a mixture of a binder polymer, a toner wetting/spreading agent, a lightfastness agent, a biocide, and a filler, and (4) a traction controlling layer in contact with the substrate, and comprised of a mixture of a polymer with a glass transition temperature of from about −50° C. to about 50° C., an antistatic agent, a lightfastness agent, a filler and a biocide.

2. A coated xerographic photographic paper in accordance with claim 1 wherein the substrate is a cellulosic substrate and is comprised of alkaline sized and acid sized blends of hardwood kraft and softwood kraft fibers, which blends contain from about 10 percent to about 90 percent by weight of softwood and from about 90 to about 10 percent by weight of hardwood.

3. A coated xerographic photographic paper in accordance with claim 2 wherein the sizing value of the cellulosic substrate is from about 200 seconds and about 1,100 seconds, the porosity is from about 50 to about 300 mil/minute, and the thickness is from about 50 microns and about 250 microns.

4. A coated xerographic photographic paper in accordance with claim 1 wherein the antistatic layer contains (1) quaternary acrylic copolymer latexes, (2) poly(acrylamide-co-diallyl dimethyl ammoniumchloride), (3) quaternary block copolymers, (4) o-xylylene bis(triphenyl)phosphonium bromide, (5) heptyltriphenyl phosphonium bromide, (6) dodecyl triphenyl phosphonium bromide, (7) [3-(ethoxycarbonyl)-2-oxypropyl]triphenyl phosphonium chloride, (8) [3-(ethoxycarbonyl)-2-propyl]triphenyl phosphonium bromide, (9) benzyltriphenyl phosphonium bromide, (10) (ethoxy carbonyl methyl)dimethylsulfonium bromide, (11) tetraoctyl phosphonium bromide, (12) tetraethylammonium hexafluoro phosphate, (13) tetrabutylammonium dihydrogen phosphate, (14) tetramethyl ammonium hydrogen phthalate, (15) (R)-(−)-3-pyrrolidinolhydrochloride, (16) 1-propylpyridinium bromide, (17) 2-propylisoquinolinium bromide, (18) 1-phenacylpyridinium bromide, (19) 1,3-didecyl-2-methyl imidazolinium chloride, (20) bis(tetramethylammonium) carbonate, (21) bis(tetrabutylammonium)sulfate, (22) (2-acryloyloxyethyl) (benzoylbenzyl) dimethyl ammonium bromide, (23) (2-acryloyloxyethyl)trimethyl ammonium methyl sulfate, (24) 2,5-dimethoxy-4-morpholino aniline dihydrochloride, (25) 4-bromo piperidinehydrobromide, (26) 3-amino-1H-isoindole hydrochloride, (27) 2-amino-4'-methoxyacetophenone hydrochloride, (28) (S)-(+)-2-amino-3-cyclohexyl-1-propanol hydrochloride, or (29) 2-amino-4'-bromoacetophenone hydrochloride.

5. A coated xerographic photographic paper in accordance with claim 1 wherein in the toner layer the binder is present in amounts of from about 35 parts by weight to about 90 parts by weight, the toner wetting agent is present in amounts of from about 45 parts by weight to about 1 part by weight, the lightfastness agent is present in amounts of from about 15 parts by weight to about 1 part by weight, the filler is present in amounts of from about 1 part by weight to about 7 parts by weight, and the biocide is present in amounts of from about 4 parts by weight to about 1 part by weight.

6. A coated xerographic photographic paper in accordance with claim 1 wherein the binder polymer of the toner receiving layer is present in amounts of from about 35 parts to about 90 parts by weight, and which binder is selected from the group consisting of (1) polyethylene terephthalate resins, (2) polybutylene terephthalate ester resins, (3) polyarylate resins, (4) bisphenol-A fumarate polyester resins, (5) rosin modified maleic polyester resins, (6) polyester adipate, (7) polyester azelate, (8) polyester glutarate, (9) polyester nylonate, (10) polyester phthalate, (11) poly (ethylene adipate), (12) poly(ethylene succinate), (13) poly (ethylene azelate), (14) poly(1,4-butylene adipate), (15) poly(trimethylene adipate), (16) poly(trimethylene glutarate), (17) poly(trimethylene succinate), (18) poly (hexamethylene succinate), (19) poly(vinyl stearate), (20) poly(vinylpropionate), (21) poly(vinylpivalate), (22) poly (vinylneodecanoate), (23) poly(diallylphthalate), (24) poly (diallylisophthalate), (25) thiodipropionate polyester, (26) polyester-ether resins, (27) polycarbonates, (28) polyester-co-polycarbonate, (29) cellulose triacetate, (30) cellulose acetate butyrate, (31) cellulose acetate propionate, (32) cellulose propionate, (33) cellulose acetate hydrogen phthalate, (34) hydroxypropylmethyl cellulose phthalate, (35) hydroxypropyl methyl cellulose succinate, (36) cyanoethylated cellulose, (37) vinylalcohol-vinylacetate copolymer, (38) vinylchloride-vinylalcohol-vinylacetate terpolymer, (39) polyester latex, (40) neoprene latex, (41) acrylic emulsion latex, and (42) styrene-butadiene latex.

7. A coated xerographic photographic paper in accordance with claim 1 wherein the toner wetting agent is comprised of polyoxyalkylene containing polymers present in amounts of from about 45 parts by weight to about 1 part by weight, and is selected from the group consisting of (1) poly(ethylene oxide), (2) ethylene oxide/propyleneoxide copolymers, (3)

ethyleneoxide/2-hydroxyethyl methacrylate/ethyleneoxide, (4) ethyleneoxide/hydroxypropyl methacrylate/ethyleneoxide triblock copolymers, (5) ionene/ethyleneoxide/ionene triblock copolymers, (6) ethyleneoxide/isoprene/ethyleneoxide triblock copolymers, (7) epichlorohydrin-ethylene oxide copolymer, and mixtures thereof.

8. A coated xerographic photographic paper in accordance with claim 1 wherein the toner wetting/spreading agent of the toner receiving layer is a liquid crystalline material present in amounts of from about 45 parts by weight to about 1 part by weight, and is selected from the group consisting of (1) 4-(trans-4-pentyl-cyclohexyl)benzonitrile, (2) 4'-pentyl-4'-biphenylcarbonitrile, (3) 4'-(pentyl oxy)-4-biphenylcarbonitrile, (4) 4'-hexyl-4-biphenyl carbonitrile, (5) 4'-(hexyloxy)-4-biphenyl carbonitrile, (6) 4'-heptyl -4-biphenyl carbonitrile, (7) 4'-heptyloxy-4-biphenyl carbonitrile, (8) 4'-octyl-4-biphenyl carbonitrile, (9) 4'-(octyloxy)-4-biphenyl carbonitrile, (10) 1-isothiocyanato-4-(trans-4-propyl cyclohexyl)benzene, (11) 1-(trans-4-hexyl cyclohexyl)-4-isothiocyanato benzene, (12) 1-(4-trans-hexyl cyclohexyl)-4-[2-(4-isothiocyanatophenyl)ethyl] benzene, (13) 1-isothiocyanato-4-(trans-4-octyl cyclohexyl) benzene, (14) 4-isothiocyanato phenyl-4-penta bicyclo [2.2.2]octane-1-carboxylate (Aldrich #37,005-3), (15) (R)-4-[(1-methylheptyl oxy)carbonyl]phenyl-4'-octyloxy-4-biphenyl carboxylate, (16) (S)-4-[(1-methyl heptyloxy) carbonyl]phenyl-4'-octyloxy-4-biphenyl carboxylate, (17) 4-methoxy-benzylidene-4'-n-butylaniline, (18) 4,4'-dihexylazoxybenzene, (19) 4,4'-diheptyl azoxybenzene, (20) 4,4'-dipentyl azoxybenzene, (21) (−)2-methyl butyl-4-(4'-methoxy benzylidene-amino) cinnamate, (22) (S)-(+)-2-methylbutyl-4-(4-decyloxy benzylidene-amino) cinnamate, (23) ethyl-4-ethoxybenzal-4'-amino cinnamate, (24) 2-(4-pentylphenyl)-5-(4-pentyloxyphenyl)pyrimidine, (25) 4-[(R)-(−)2-chloro-3-methylbutyryl-oxy]phenyl-4-(decyloxy) benzoate, (26) 4-[(S)-(+)2-chloro-3-methyl butyryloxy] phenyl-4-(decyloxy)benzoate, (27) 4-[(S)-(+)-(4-methylhexyl)oxy] phenyl-4-(decyloxy)benzoate, (28) 4-[(S) -(−)-2-ethoxypropoxy]phenyl-4-(decyloxy)benzoate, (29) 4-hexylbenzoic acid, (30) cholesteryl heptanoate, (31) cholesteryl octanoate, (32) cholesteryl nonanoate, (33) cholesteryl palmitate, (34) cholesteryl palmitate, (35) cholesteryl oleyl carbonate, (36) cholesteryl stearate, (37) cholesteryl hydro cinnamate, (38) cholesteryl acetate, (39) cholesteryl chloroformate, and mixtures thereof.

9. A coated xerographic photographic paper in accordance with claim 1 wherein the lightfastness agent is present in amounts of from about 15 parts by weight to about 1 part by weight, and is selected from the group consisting of (A) UV absorbing compounds, (B) antioxidant compounds, (C) antiozonant compounds, and (D) mixtures thereof.

10. A coated xerographic photographic paper in accordance with claim 1 wherein the filler component of the toner layer coating is present in amounts of from about 1 part by weight to about 7 parts by weight, and which filler is selected from the group consisting of (1) microspheres of sodium borosilicate glass, (2) microspheres of soda lime glass, (3) microspheres of phenolic polymers, (4) vinylidene chloride-acrylonitrile microspheres, (5) hollow composite microspheres of polyvinylidene chloride/acrylonitrile copolymer shell, 15 percent by weight, and calcium carbonate, 85 percent by weight, (6) stearate coated calcium carbonate, (7) sodium metasilicate anhydrous, (8) sodium metasilicate pentahydrate, (9) organophilic montmorillonitrile clay, (10) magnesium aluminum silicate, (11) magnesium carbonate, (12) magnesium oxide, (13) zirconium oxide, (14) colloidal silicas, (15) titanium dioxide, (16) hydrated alumina, (17) barium sulfate, (18) calcium carbonate, (19) high brightness clays, (20) calcium silicate, (21) blends of calcium fluoride and silica, (22) zinc oxide, (23) blends of zinc sulfide with barium sulfate, (24) barium titanate, (25) fluorescent pigments of coumarin, (26) fluorescent pigments of oxazole, (27) antimony oxide; and mixtures thereof.

11. A coated xerographic photographic paper in accordance with claim 1 wherein the thickness of said antistatic layer coating, which is in contact with the front side of the substrate, is from about 0.1 to about 25 microns.

12. A coated xerographic photographic paper in accordance with claim 1 wherein in the tracton controlling layer coating (4) the polymer binder is present in an amount of from about 10 parts by weight to about 50 parts by weight, the antistatic agent is present in an amount of from about 1 part by weight to about 20 parts by weight, the lightfastness agent is present in an amount of from about 1 part by weight to about 10 parts by weight, the filler is present in an amount of from about 87 parts by weight to about 16 parts by weight, and the biocide is present in an amount of from about 1 part by weight to about 4 parts by weight.

13. A coated xerographic photographic paper in accordance with claim 1 wherein in the traction controlling layer coating (4) the polymer possesses a glass transition temperature of from about −40° C. to about 40° C., and which polymer is a water soluble/dispersible polymer selected from the group consisting of (1) a polyester latex, (2) a neoprene latex, (3) an acrylic emulsion latex, and (4) a styrene-butadiene latex.

14. A coated xerographic photographic paper in accordance with claim 1 wherein in the traction controlling layer (4) the polymer possesses a glass transition temperature of from about −40° C. to about 35° C., and which polymer is a solvent soluble polymer selected from the group consisting of a (1) poly(2-hydroxyethylacrylate), (2) poly (hydroxypropylacrylate), (3) poly(n-hexyl methacrylate), (4) poly(2-ethylhexyl methacrylate), (5) poly(isodecyl methacrylate), (6) polyethylene, (7) polypropylene, (8) poly (1-butene), (9) ethylene-propylene copolymer, (10) ethylene-ethylacrylate copolymer, (11) ethylene-propylene-diene terpolymer, (12) polychloroprene, (13) polyvinylmethylether, (14) polyvinyl isobutyl ether, and (15) crosslinked polyesters.

15. A coated xerographic photographic paper in accordance with claim 1 wherein the thickness of said toner receiving layer in contact with the back side of the cellulosic substrate is from about 0.1 to about 25 microns.

16. A coated xerographic photographic paper in accordance with claim 1 wherein (a) the antistatic layer is comprised of about 90 percent by weight of film forming polymers selected from the group consisting of quaternary acrylic copolymer latexes, poly(acrylamide-co-diallyl dimethyl ammonium chloride), quaternary block copolymers, and about 10 percent by weight of non-film forming quaternary compounds selected from the group consisting of benzyltriphenyl phosphonium bromide, tetra methyl ammonium hydrogen phthalate, 1-propyl pyridinium bromide; (b) the toner receiving layer on the top of the first layer is comprised of a blend of (1) a polymeric binder present in amounts of from about 40 to about 85 parts by weight, and selected from the group consisting of vinyl alcohol-vinyl acetate copolymer, hydroxypropyl methyl cellulose succinate, polyester, (2) a toner wetting/spreading agent present in amounts of from about 40 parts by weight to about 5 parts by weight, and selected from the group consisting of polyethylene oxide, 4-(trans-4-pentylcyclohexyl)

benzonitrile, (S)-(+)-2-methylbutyl-4-(4-decyloxybenzylidene-amino)cinnamate, (3) lightfastness agents present in amounts of from about 14 parts by weight to about 4 parts by weight, and selected from the group consisting of the UV absorbing compound poly[N,N-bis(2,2,6,6-tetramethyl-4-piperidinyl)-1,6-hexanediamine-co-2,4-dichloro-6-morpholino-1,3,5-triazine], or 2-(4-benzoyl-3-hydroxyphenoxy) ethylacrylate, the antioxidant compound didodecyl-3,3'-thiodipropionate, or ditridecyl-3,3'-thiodipropionate, ditetradecyl-3,3'-thiodipropionate, the antiozonant compound N-(1,3-dimethylbutyl)-N'-phenyl-phenylenediamine, or N,N'-di(2-octyl)-p-phenylene diamine, and mixtures thereof, (4) the biocide is present in amounts of from about 3 parts by weight to about 1 part by weight, and is selected from the group consisting of 2-hydroxy propylmethane thiosulfonate, and 2-(thiocyanomethylthio) benzothiaole, ethylene bis (thiocyanate), (5) the filler is present in amounts of from about 2 parts by weight to about 5 parts by weight, and is selected from the group consisting of microspheres of phenolic polymers, vinylidene chloride-acrylonitrile microspheres, and colloidal silicas; and (c) the traction controlling layer which is in contact with the backside/reverse side of the substrate is comprised of (1) a polymer with a glass transition temperature of from between about −50° C. to about 50° C. present in amounts of from about 15 parts by weight to about 46 parts by weight, and is selected from the group consisting of a polyester latex, a neoprene latex, an acrylic copolymer latex, a styrene-butadiene latex, a crosslinked polyester, (2) the antistatic agent is present in an amount of from about 5 parts by weight to about 15 parts by weight and is selected from the group consisting of sodium dioctyl sulfosuccinate, sodium sulfosuccinate ester of lauric diethanol amide, sodium lauryl sulfosuccinate, calcium dodecyl benzene sulfonate, and soya diethanol amide, (3) the lightfastness agent is present in amounts of from about 2 parts by weight to about 10 parts by weight, and is selected from the group consisting of the UV absorbing compound poly[N,N-bis(2,2,6,6-tetramethyl-4-piperidinyl)-1,6-hexanediamine-co-2,4-dichloro-6-morpholino-1,3,5-triazine], or 2-(4-benzoyl-3-hydroxyphenoxy)ethyl acrylate, the antioxidant compound didodecyl-3,3'-thiodipropionate, ditridecyl3,3'-thiodipropionate, or ditetradecyl-3,3'-thiodipropionate, the antiozonant compound N-(1,3-dimethylbutyl)-N'-phenyl-phenylene diamine, or N,N'-di(2-octyl)-p-phenylene diamine, and mixtures thereof, (4) the filler is present in amounts of from about from about 77 parts by weight to about 25 parts by weight 1, and is selected from the group consisting of vinylidene chloride-acrylonitrile microspheres, colloidal silicas, fluorescent pigments of coumarin derivatives, and fluorescent pigments of oxazole derivatives, and (5) the biocide is present in amounts of from about 1 part by weight to about 4 parts by weight, and is selected from the group consisting of 2-hydroxy propylmethane thiosulfonate, and 2-(thiocyanomethylthio) benzothiaole, ethylene bis(thiocyanate).

17. A coated xerographic photographic paper in accordance with claim 1 wherein (a) the antistatic layer is comprised of a quaternary acrylic copolymer latex, and 1-propyl pyridinium bromide; (b) the toner receiving layer on the top of the antistatic layer is comprised of a blend of (1) a polyester binder present in amounts of 85 parts by weight, (2) a toner wetting agent (S)-(+)-2-methyl butyl-4-(4-decyloxy benzylidene-amino)cinnamate present in amounts of 8 parts by weight, (3) a lightfastness agent of poly[N,N-bis-(2,2,6,6-tetramethyl-4-piperidinyl)-1,6-hexane diamine-co-2,4-dichloro-6-morpholino-1,3,5-triazine], an antioxidant compound of didodecyl-3,3'-thiodipropionate, (4) a biocide of 2-hydroxy propylmethane thiosulfonate, (5) a filler of colloidal silica; and (c) a traction controlling coating in contact with the backside/reverse side of the substrate, and comprised of (1) crosslinked polyester, (2) antistatic agent sodium sulfosuccinate ester of lauric diethanol amide, (3) a lightfastness UV compound of 2-(4-benzoyl-3-hydroxyphenoxy)ethyl acrylate, an antioxidant compound of didodecyl-3,3'-thiodipropionate, (4) vinylidene chloride-acrylonitrile microspheres, and (5) a biocide of 2-hydroxy propylmethane thiosulfonate.

18. An imaging process which comprises (1) generating an electrostatic latent image on an imaging member in an imaging apparatus; (2) developing the latent image with a toner which comprises a colorant and a resin optionally selected from the group consisting of (A) polyesters, (B) styrene-butadiene copolymers, (C) styrene-acrylate copolymers, and (D) styrene-methacrylate copolymers; (3) transferring the developed image to the toner receiving layer of the coated paper of claim 1; and (4) fixing the image onto the paper with heat and pressure.

19. An imaging process which comprises (1) generating an electrostatic latent image on an imaging member in an imaging apparatus; (2) developing the latent image with a toner which is comprised of a colorant and a resin optionally selected from the group consisting of (A) polyesters, (B) styrene-butadiene copolymers, (C) styrene-acrylate copolymers, and (D) styrene-methacrylate copolymers; (3) transferring the developed image to the toner receiving layer of the paper of claim 17; and (4) fixing the image onto the paper with heat and pressure.

20. An imaging process in accordance with claim 18 wherein the images resulting on the paper possess an optical density between about 1.45 to about 1.56 for a black toner, between about 1.35 to about 1.40 for a cyan toner, between about 1.23 to about 1.30 for a magenta toner, between about 0.87 to about 0.89 for a yellow toner, with lightfast values of about 100 percent for all of said toners, waterfastness values of about 100 percent for all of said toners, and gloss values of from 90 to 95 on the toner receiving layer of the coated xerographic photographic paper.

21. An imaging process in accordance with claim 18 wherein the colorant is a pigment.

22. An imaging process in accordance with claim 18 wherein the colorant is a dye.

23. An imaging process which comprises (1) generating an electrostatic latent image on an imaging member; (2) developing the latent image with a toner; (3) transferring the developed image to the toner receiving layer of the coated paper of claim 1; and (4) fixing the image onto the paper.

24. An imaging process in accordance with claim 23 wherein the imaging member is a photoconductive imaging member, and fixing is by heat and pressure.

25. An imaging process in accordance with claim 23 wherein the toner is comprised of thermoplastic resin, and colorant.

26. An imaging process in accordance with claim 18 wherein there results developed images on the third traction controlling layer with an optical density between about 1.45 to about 1.53 for a black toner, between about 1.35 to about 1.40 for a cyan toner, between about 1.20 to about 1.30 for a magenta toner, between about 0.87 to about 0.89 for a yellow toner, with lightfast values of about 100 percent for all of said toners and waterfastness values of about 100 percent for all of said toners, and gloss values of from about 50 to about 65.

27. A photographic paper comprised of a substrate, (1) an antistatic layer in contact with the substrate, (2) a toner receiving layer in contact with the the antistatic layer, which layer is comprised of a binder polymer, a toner wetting/spreading agent, a lightfastness agent, an optional biocide, and a filler, and (3) a traction controlling layer in contact with the substrate, and comprised of a polymer, an antistatic agent, a lightfastness agent, a filler and an optional biocide.

* * * * *